(12) United States Patent
Anantharaman et al.

(10) Patent No.: US 11,775,364 B2
(45) Date of Patent: Oct. 3, 2023

(54) SYSTEMS AND METHODS FOR USE IN CORRELATING MESSAGES ACROSS DISPARATE INTERFACES

(71) Applicant: MASTERCARD INTERNATIONAL INCORPORATED, Purchase, NY (US)

(72) Inventors: Raghuraman Anantharaman, Wildwood, MO (US); Ragunath Venkatapathy, O'Fallon, MO (US); Prasanna Srinivasan Narasimhan, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 123 days.

(21) Appl. No.: 17/484,783

(22) Filed: Sep. 24, 2021

(65) Prior Publication Data

US 2022/0100592 A1 Mar. 31, 2022

Related U.S. Application Data

(60) Provisional application No. 63/083,701, filed on Sep. 25, 2020.

(51) Int. Cl.
*G06F 9/54* (2006.01)
*G06F 9/30* (2018.01)
*G06F 9/38* (2018.01)

(52) U.S. Cl.
CPC .......... *G06F 9/547* (2013.01); *G06F 9/30087* (2013.01); *G06F 9/3836* (2013.01)

(58) Field of Classification Search
None
See application file for complete search history.

(56) References Cited

U.S. PATENT DOCUMENTS

| 2017/0262819 | A1* | 9/2017 | Malhotra | G06Q 20/3276 |
| 2017/0364601 | A1* | 12/2017 | Charles | G06F 16/955 |
| 2020/0349639 | A1* | 11/2020 | Mousseau | G06Q 20/04 |

* cited by examiner

*Primary Examiner* — Syed A Roni
(74) *Attorney, Agent, or Firm* — Harness, Dickey & Pierce, P.L.C.

(57) ABSTRACT

Systems and methods are provided for correlating messages between disparate interfaces, channels, and/or networks. One example computer-implemented method includes receiving, at a service computing device, a request from a user relating to at least one service associated therewith and compiling a message consistent with a first message standard based on the request. The method also includes requesting a global unique identifier (GUID) for the request from a generator, where the generator compiles the GUID and returns the GUID to the service computing device, and serializing the GUID and the compiled message to form a serialized message in which the compiled message defines a first parameter and the GUID defines a second parameter. The method then includes transmitting the serialized message to a message gateway, whereby the GUID is provided with the compiled message, while maintaining the compiled message consistent with the first message standard.

17 Claims, 3 Drawing Sheets

SYSTEMS AND METHODS FOR USE IN CORRELATING MESSAGES ACROSS DISPARATE INTERFACES

CROSS-REFERENCE TO RELATED APPLICATION

This application claims the benefit of, and priority to, U.S. Provisional Application No. 63/083,701, filed Sep. 25, 2020. The entire disclosure of the above application is incorporated herein by reference.

FIELD

The present disclosure is generally directed to systems and methods for use in correlating messages across multiple disparate interfaces (e.g., channels and/or networks, etc.), and in particular, to systems and methods for use in correlating messages based on universal correlation identifiers for messages that are transmitted across disparate interfaces (e.g., channels and/or networks, etc.).

BACKGROUND

This section provides background information related to the present disclosure which is not necessarily prior art.

It is known to provide network messaging for various types of interactions between parties. For example, authorization message are known to be exchanged between merchants and issuers of payment accounts, via payment networks, to facilitate payment account transactions. The authorization messages generally abide by a standard (e.g., an ISO 8586 standard, etc.) as defined and/or adopted by the payment networks. In addition, payment account transactions may be initiated in manners apart from the standard, yet converted, either by the payment networks or other entities, into messages consistent with the standard (i.e., into standard messages). And, further, it is known for payment account transactions to be identified by transaction identifiers (i.e., transaction IDs), which are included in the standard messages.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying figures/drawings. The description and specific examples included herein are intended for purposes of illustration only and are not intended to limit the scope of the present disclosure.

In connection with generating and passing messages to facilitate payment account transactions, the messages are generally consistent with a specific format, or network, through which the payment account transactions are facilitated. When the transactions are initiated in one manner (or in one format), and continue in another manner (or in another format), where one or both manners are not consistent with a standard format for processing the transactions, it is problematic to track the transactions from end-to-end in the absence of a uniform identification of the transactions and, as such, may be inefficient to determine a status of the transactions. What's more, in the event of a failure or fault in the transactions, the fault is not readily traceable across the network.

Uniquely, the systems and methods herein implement an enhanced remote procedure call (RPC) (e.g., gRPC (as developed by Google®), etc.) to transport transaction messages for a transaction (e.g., a transfer request messages for a fund transfer, etc.), whereby a unique identifier associated with the transaction is appended to each of the messages (e.g., to a header or wrapper on top of a payload, etc.) (regardless of format). In connection therewith, for each of the messages for the transaction, a conventional transaction message (e.g., consistent with an ISO standard, etc.) is included as the payload of the given message. The systems and methods herein may further rely on serialization of the data included in the transaction messages (e.g., in accordance with protocol buffers (protobuf), etc.) for data transfer. In this manner, then, the transaction messages from one end of a payment network (or beyond) (e.g., initiated through one interface (e.g., one channel or network, etc.), etc.) to the other end of the payment network (or banking institution, etc.) (e.g., handled/processed in another interface (e.g., via another channel or network, etc.), etc.) are identifiable (e.g., without altering the ISO standard, etc.), whereby individual transactions are traceable for end-to-end visibility, for example, for reasons associated with status of the transactions, diagnosis, fraud scoring, insights, etc.

Figure 1:
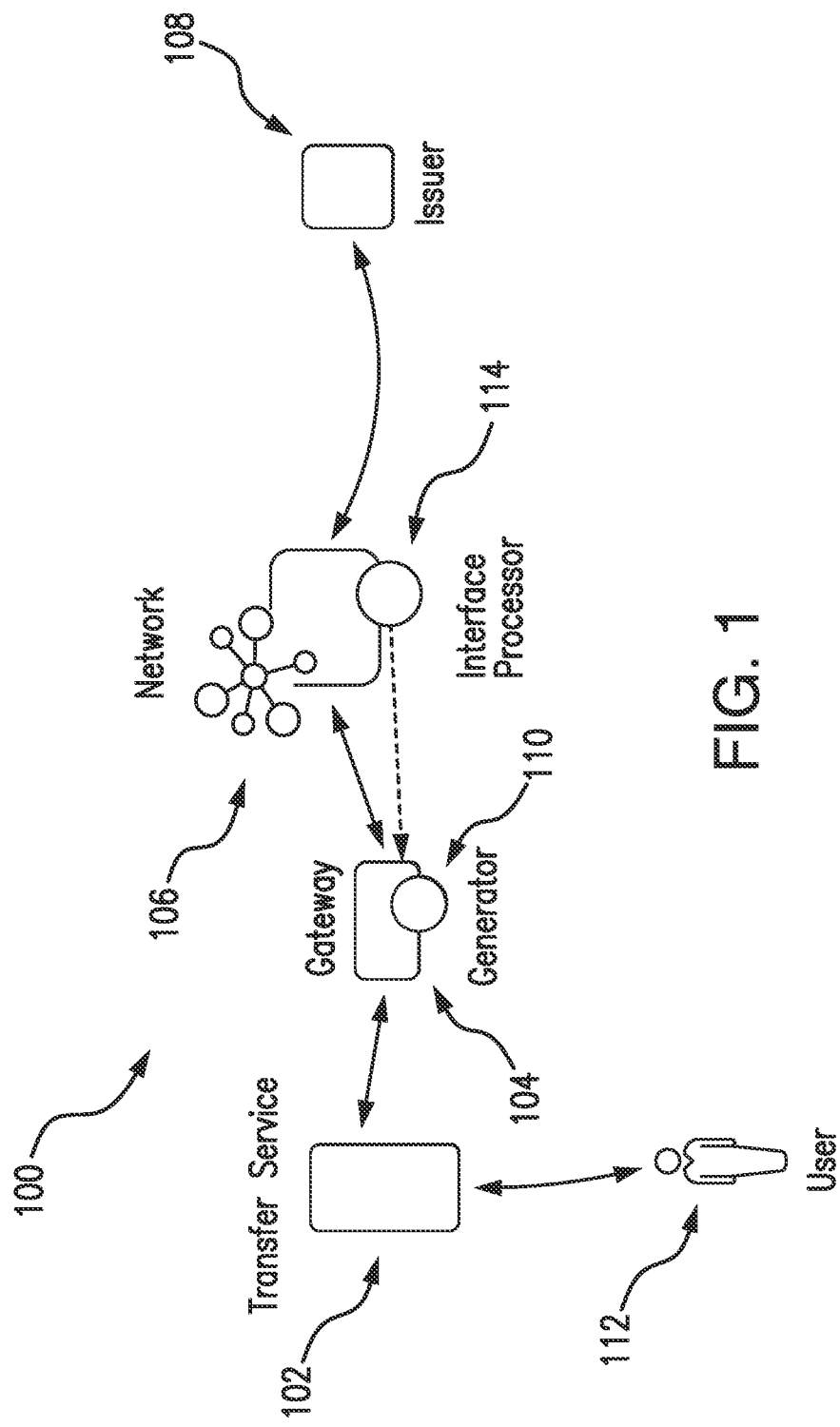
FIG. 1 is an example system of the present disclosure suitable for use in correlating messages across multiple disparate interfaces.

FIG. 1 illustrates an example system 100, in which one or more aspects of the present disclosure may be implemented. Although the system 100 is presented in one arrangement, other embodiments may include the parts of the system 100 (or other parts) arranged otherwise depending on, for example, relationships among different participants, types of transactions, parties and/or networks involved with the transactions, origination of the transactions, privacy requirements, etc.

As shown in FIG. 1, the illustrated system 100 generally includes a transfer service 102 (broadly, a service), a message gateway 104, a payment network 106, and an issuer 108 of accounts, each of which includes (or is associated with) a computing device coupled to and/or in communication with one or more networks (as indicated by the arrowed lines). The one or more networks may include, for example, one or more of, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. Furthermore, it should be appreciated that the one or more of the networks may be consistent with one or more protocols, including, for example, the Hypertext Transfer Protocol (HTTP)/1.1 or HTTP/2.0 network protocol, etc.

In general, the transfer service 102 is a fund transfer service, such as, for example, MoneySend™ by Mastercard International Incorporated, etc. (e.g., associated with the payment network 106 and configured to provide a service in connection therewith, etc.) The transfer service 102, in this example embodiment, permits a user 112 to initiate a fund transfer (broadly, a transaction) associated with a payment account to another user or a separate entity (broadly, a recipient) (e.g., a P2P transfer, a P2B transfer, etc.) without a dedicated payment terminal (e.g., without a point-of-sale (POS) terminal associated with a merchant, etc.) being associated with the recipient of the funds, etc. In general, the transfer service 102 is a first interface (e.g., channel, network, etc.) for initiating a transaction (e.g., a fund transfer, etc.). The transfer service 102 may be accessible to the user 112 via a network-based application, via an application programing interface (API) call form a banking application or otherwise, etc. (e.g., at a mobile device of the user 112, at another computing device of the user 112, etc.). The transfer service 102 is therefore configured to receive a fund transfer request (broadly, a transaction request) from the user 112 relating to a fund transfer (e.g., where the fund transfer request is not an ISO standard message, etc.) and then to submit a transfer request message (broadly, a transaction message or transaction request message) for the transfer request to the message gateway 104. It should be appreciated that other services (e.g., other than the transfer service 102, etc.) may be included in the system 100 in other embodiments (e.g., another service relating to sending money, a real-time payment service, etc.).

It should be appreciated that the transfer service 102, the gateway 104 and the payment network 106, at least, in this embodiment, are coupled via a distributed computing arrangement consistent with a remote procedure call (RPC) framework. And, in particular, in this example, the distributed computing arrangement is consistent with gRPC, etc. As such, backward compatibility may be available between the transfer service 102, the gateway 104, and/or the payment network 106, etc. It should be appreciated, however, that other types of calls and/or arrangements may be employed between these parts of the system 100 (and other parts) consistent with the description herein. What's more, in this example embodiment, the transfer service 102 is coupled to the gateway 104 and the payment network 106, via one or more networks, which abide by the HTTP/2.0 network protocol. That said, it should be appreciated that other network protocols may be employed within the scope of the present disclosure, which permit and/or are suitable for use with the description herein (e.g., other TCP/IP protocols, etc.) (e.g., enabling enhanced data mining via correlation and further associated with predictive and preemptive data solutions, etc.).

It should also be appreciated that, even though the transfer service 102 and the gateway 104 are illustrated as separate entities in FIG. 1, the transfer service 102 and the gateway 104 may be part of the payment network 106 in various embodiments (e.g., to facilitate services associated with the payment network 106, etc.).

In particular in this example embodiment, in response to the transfer request from the user 112, the transfer service 102 is configured to request a global unique identifier (GUID) from an identifier generator 110. The generator 110 is coupled in communication with the transfer service 102 (via one or more networks), and is configured, in turn, to generate the GUID in response to the request from the transfer service 102 (where the GUID may be unique and/or specific to the given transfer request (or transfer or transaction associated therewith)). The generator 110 may be associated with the gateway 104 (as illustrated, for example, in FIG. 1) or it may be associated with the payment network 106, or otherwise, or it may be a standalone part of the system 100. Regardless, in general, the generator 110 is accessible to various services associated with the payment network 106 (i.e., beyond the transfer service 102 described herein), whereby any service, or computing device associated with such service, may request a GUID, like the transfer service 102, to associate with a fund transfer (or other transaction) and/or other message provided to and/or associated with the payment network 106 (e.g., a fund transfer and/or a fund transfer message and/or a transfer request message, etc.). As such, in this example embodiment, the generator 110 is configured to generate the GUID and to then provide the GUID back to the transfer service 102 (or other service). In connection therewith, the GUID may be generated randomly by the generator 110, or it may be part of a sequential generation or based on one or more aspects of (or parties involved in) the fund transfer, etc.

As shown in FIG. 1, in this example, again, the identifier generator 110 is included as part of the gateway 104. However, in other embodiments, the generator 110 may be included as part of the payment network 106, or another suitable part of the system 100, or it may be a standalone part of the system 100. What's more, it should be appreciated that the transfer service 102 and the gateway 104 may be included in or may be part of the payment network 106 (along with the generator 110, or separate therefrom).

At the same time the transfer service 102 requests the GUID (or before or after) (broadly, in response to the transfer request), the transfer service 102 also is configured to compile an ISO standard message (e.g., in accordance with ISO 8583, ISO 20022, etc.) for the fund transfer. In doing so, a unique transaction ID is generated for and/or provided for the fund transfer (e.g., by the transfer service 102, randomly, etc.), and included in the ISO standard message for the fund transfer. And, the transfer service 102 is configured to then include the ISO standard message as a payload of the transfer request message (that is to be sent to the gateway 104) (e.g., as a first parameter of the transfer request message, etc.). Additionally, in response to the GUID, the transfer service 102 is configured to include or append the GUID as a header or wrapper of/for the transfer request message (e.g., as a second parameter of the transfer request message, etc.). Uniquely, in this example embodiment (and as indicated above), the transfer service 102 is configured to communicate with the gateway 104 consistent with the enhanced RPC (e.g., gRPC, etc.) to then transport the transfer request message for the fund transfer (including the ISO standard message and the GUID) to the gateway 104. As such, the gRPC permits the transfer service 102 to compile the ISO standard message for the fund transfer (e.g., generally as is conventional, etc.) as the payload of the transfer request message, and further to append the GUID as the header or wrapper for the transfer request message, and then to transmit the transfer request message to the gateway 104.

More specifically in this example, as part of compiling the transfer request message, the fund transfer service 102 is configured to serialize content for the transfer request message into two parameters as defined, for example, by Protocol Buffer (or Protobuf) or other suitable method, mechanism, platform, etc. The transfer request message (when serialized) is associated with a data definition, whereby a first parameter is defined as having a specific size (e.g., 128 bits, 256 bits, etc.), while a second parameter may include a specific size, or may be defined as the remainder of the message, etc. In this manner, the ISO standard message is preserved consistent with the ISO standard (without having to define a specific data element (DE) for the GUID, yet the GUID is still included in the message). The fund transfer service 102 is configured to then transmit the transfer request message, and its contents, to the gateway 104 (which, in general, is a second interface (e.g., channel, network, etc.) for processing and/or handling the fund transfer, etc.). More generally, in serializing the ISO standard message and the GUID, the fund transfer service 102 is configured to construct a wrapper on top of the ISO standard message and tag it with the GUID.

In turn, the gateway 104 is configured to receive the transfer request message from the transfer service 102. In response, the gateway 104 is configured to de-serialize the data in the transfer request message, whereby the GUID is pulled off of the message, and the payload is preserved as the ISO standard message, whereby the structured data of the ISO standard message is retained. For example, the gateway 104 may be configured to separate (or extract or pull, etc.) the ISO standard message from the payload of the transfer request message. The gateway 104 is configured to then transmit the ISO standard message to the payment network 106 (apart from the transfer request message and GUID). In addition, uniquely, the gateway 104 is configured to retrieve the GUID from the transfer request message and compile a mapping data structure for the fund transfer, whereby the GUID is stored and associated with transaction data from the ISO standard message for the fund transfer (e.g., the transaction ID, etc.).

In this example embodiment, the payment network 106 includes an interface processor 114 configured to receive the ISO standard message from the gateway 104 for the fund transfer. The interface processor 114 may be consistent, in this embodiment, with a Mastercard™ interface processor (MIP) associated with, or part of, the Banknet global network operated by Mastercard International Incorporated, or an interface processor of another payment network in other embodiments. The interface processor 114 is then configured to transmit the ISO standard message for the fund transfer to the issuer 108. While the interface processor 114 is shown as part of the payment network 106 in FIG. 1, it should be appreciated that the interface processor 114 may be located otherwise in other embodiments, for example, as part of the gateway 104 (as indicated by the dashed in in FIG. 1), etc.

The issuer 108 is configured to receive the ISO standard message for the fund transfer. And, the issuer 108 is configured to decide whether to approve or decline the fund transfer from the payment account associated with the user 112. The issuer 108 then is configured to respond to the ISO standard message with a reply, which indicates the approval or decline of the fund transfer, and to hold the funds for transfer when approved.

It should be appreciated that, in connection with responding to the ISO standard message for the fund transfer, the issuer 108 is configured to generate a reply message, which includes an ISO formatted message, and transmit the same back to the payment network 106 (and/or the interface processor 114 associated therewith). In turn, the payment network 106 (or interface processor 114) is configured to transmit the ISO formatted reply message to the gateway 104. In response, the gateway 104 may be configured to retrieve the GUID for the fund transfer from the mapping data structure (based on the transaction ID for the fund transfer as included in the reply message) and serialize the ISO formatted reply message (with the GUID) as described above. The gateway 104 is configured to then transmit the same back to the transfer service 102 for communication with the user 112. In this manner, the GUID may be maintained with the fund transfer, whereby tracking and/or monitoring is immediately available to the gateway 104, while analytics related to data associated with the fund transfer may be further available to the payment network 106 (in communication with the gateway 104, etc.).

Alternatively, in some embodiments, the gateway 104 may be configured to transmit the transfer request message to the interface processor 114 (of the payment network 106), including both the ISO standard message for the fund transfer and the GUID. In response, the interface processor 114 may be configured to transmit the serialized data of the transfer request message, as received (generally) from the gateway 104, to the issuer 108 (e.g., where the issuer 108 has adopted a network protocol sufficient to support the serialized data (e.g., via gRPC, etc.)). And, the issuer 108 may be configured to then pull the ISO standard message for the fund transfer from the transfer request message (and, potentially, log the GUID against the transaction ID for the fund transfer and/or transfer the same to the gateway 104 for storing in the mapping data structure, etc.). Or, when the issuer 108 is not permissive of receiving serialized messages (or has not adopted a network protocol sufficient to support the serialized data (e.g., via gRPC, etc.)), the interface processor 114 may be configured to de-serialize the data, whereby the GUID is pulled off of the transfer request message, and the payload is preserved as the ISO standard message, whereby the structured data of the ISO standard message is retained. The interface processor 114 may be configured to then transmit the ISO standard message to the issuer 108 (apart from the transfer request message and GUID) (and, potentially, log the GUID against the transaction ID for the fund transfer, etc.) (and, potentially, log the GUID against the transaction ID for the fund transfer and/or transfer the same to the gateway 104 for storing in the mapping data structure, etc.).

Figure 2:
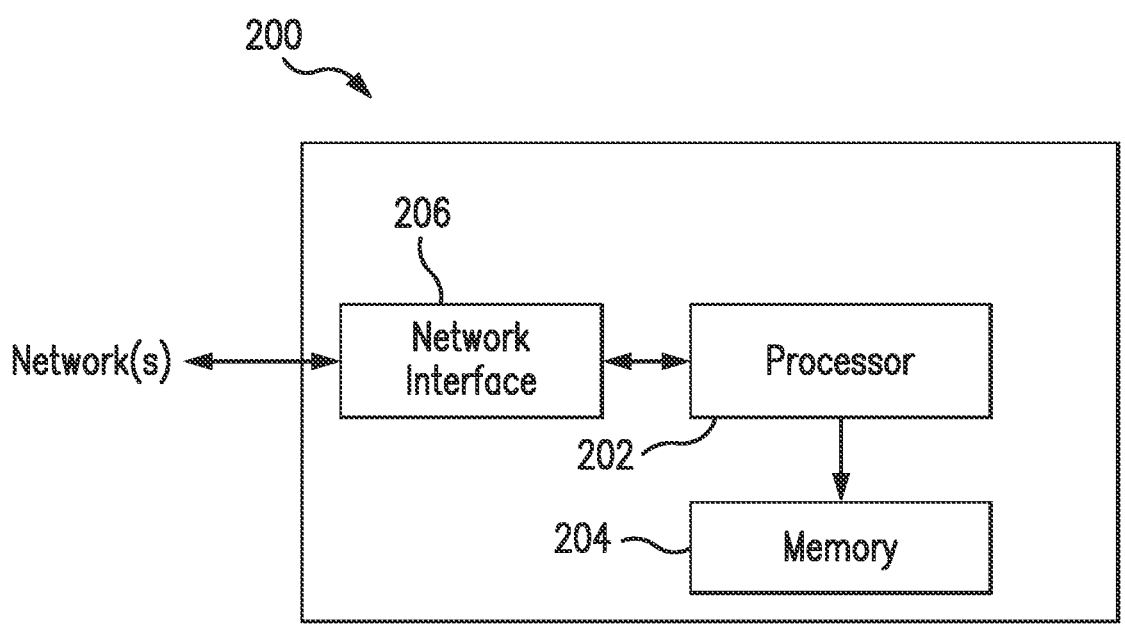
FIG. 2 is a block diagram of an example computing device that may be used in the system of FIG. 1.

FIG. 2 illustrates an example computing device 200 that can be used in the system 100 of FIG. 1. The computing device 200 may include, for example, one or more servers, workstations, personal computers, laptops, tablets, smartphones, virtual devices, etc. In addition, the computing device 200 may include a single computing device, or it may include multiple computing devices located in close proximity or distributed over a geographic region, so long as the computing devices are specifically configured to function as described herein. In the example embodiment of FIG. 1, each of the transfer service 102, the gateway 104, the payment network 106, the issuer 108, and the identifier generator 110 includes and/or is implemented in one or more computing devices consistent with computing device 200. However, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the example computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, message standards and/or descriptions, messages, GUIDs, mapping data structures, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components as specifically configured, by such instructions, to perform one or more of the various particular and unique operations herein whereby upon such performance of the instructions, the computing device 200 is transformed into a special purpose computing device (and that is not a generic computing device). It should be appreciated that the memory 204 may include a variety of different memories, each implemented in one or more of the functions or processes described herein.

Further, the illustrated computing device 200 also includes a network interface 206 coupled to (and in communication with) the processor 202 and the memory 204. The network interface 210 may include, without limitation, a wired network adapter, a wireless network adapter, a mobile network adapter, or other device capable of communicating to one or more different ones of the networks herein, including network 106, and/or with other devices described herein. In some example embodiments, the computing device 200 may include the processor 202 and one or more network interfaces incorporated into or with the processor 202.

Figure 3:
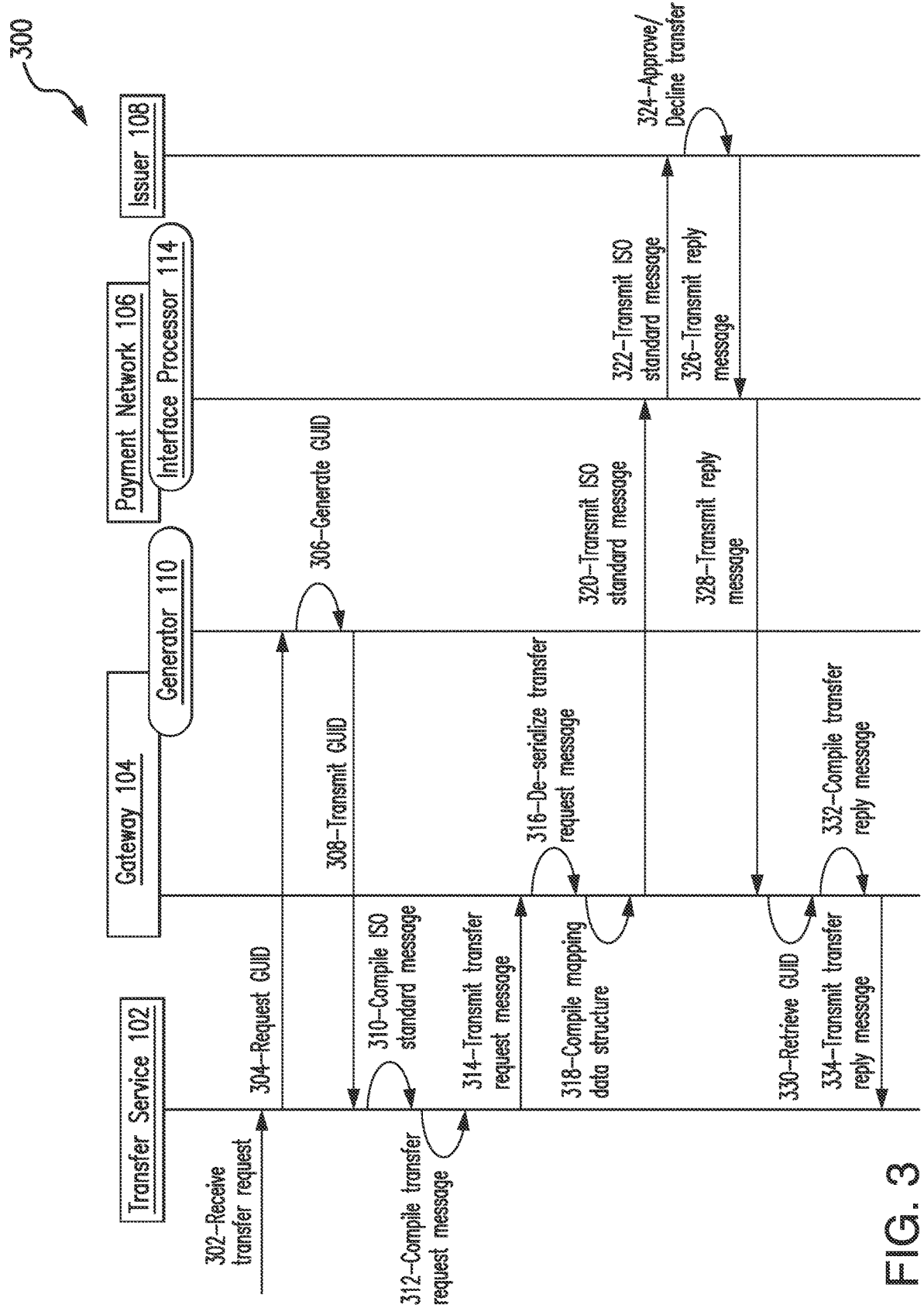
FIG. 3 is an example method that may be implemented in the system of FIG. 1 for use in correlating the messages across the multiple disparate interfaces.

FIG. 3 illustrates an example method 300 for use in correlating messages across multiple disparate interfaces. The example method 300 is described as implemented in the system 100. Reference is also made to the computing device 200. However, the method 300 should not be understood to be limited to the system 100 or the computing device 200, as the method 300 may be implemented in other systems and/or computing devices. Likewise, the systems and the computing devices herein should not be understood to be limited to the example method 300 described below.

Initially in the method 300, the user 112 desires to initiate a fund transfer to another party, for example, from the user's payment account (as issued to the user 112 by the issuer 108, etc.). In connection therewith, the fund transfer may include, without limitation, a transfer of funds from the user's payment account to another user or a separate entity (e.g., a merchant, etc.) (e.g., a P2P transfer, a P2B transfer, etc.) without a dedicated payment terminal (e.g., without a POS terminal associated with a merchant, etc.) being associated with the recipient of the funds, etc.

As such, in this example method 300, the transfer service 102 (e.g., a computing device of or associated with the transfer service 102 such as a service computing device, etc.) receives, at 302, a transfer request from the user 112. In response to the transfer request, the transfer service 102 requests, at 304, a GUID for the fund transfer from the identifier generator 110 (e.g., at the gateway 104, etc.). In turn, the generator 110 generates, at 306, the GUID and transmit, at 308, the GUID back to the transfer service 102. The GUID may be unique and/or specific to the given transfer request, and may include any suitable value (e.g., a numeric value, an alphabetic value, an alphanumeric value, etc.). As indicated above, while the GUID is generated in the generator 110 (included in the gateway 104), in this illustrated embodiment, it should be appreciated that the GUID may be generated at the transfer service 102 (based on communication with the gateway 104, or not) and assigned to the transfer request.

The transfer service 102 then compiles, at 310, an ISO standard message (e.g., in accordance with ISO 8583, ISO 20022, etc.) for the fund transfer. The transfer service 102 may compile the ISO standard message at about the same time it requests the GUID, or before or after. In general, though, the transfer service 102 compiles the ISO standard message for the fund transfer in response to the transfer request. In doing so, the transfer service 102 generates or assigns or correlates a unique transaction ID for/to the fund transfer and includes the same in the ISO standard message.

With the GUID and the ISO standard message for the fund transfer, the transfer service 102 then compiles, at 312, a transfer request message for the fund transfer. In particular, the transfer service 102 serializes the GUID and the ISO standard message to form the transfer request message (or serialized message). In doing so, the transfer request message includes the ISO standard message for the fund transfer as a payload (e.g., as a first parameter of the transfer request message, etc.) and the GUID as a header or wrapper of/for the transfer request message (e.g., as a second parameter of the transfer request message, etc.). As part of compiling the transfer request message, in this example, the fund transfer service 102 may serialize content for the message into two parameters as defined, for example, by the Protocol Buffer (or Protobuf) or other suitable method, mechanism, platform, etc. In doing so, the transfer request message (when serialized) may be associated with a data definition, whereby a first parameter may be defined as having a specific size (e.g., 128 bits, 256 bits, etc.), while a second parameter may include a specific size, or may be defined as the remainder of the message, etc. In this manner, the ISO standard message may be preserved consistent with the ISO standard (without having to define a specific DE for the GUID, yet the GUID is still included in the message).

Then, once the transfer request message is compiled, the transfer service 102 transmits, at 314, the transfer request message (e.g., the serialized message, etc.) to the message gateway 104. Uniquely in the method 300 (as in the system 100, the transfer service 102 communicates with the gateway 104 consistent with the enhanced RPC (e.g., gRPC, etc.) to transmit the transfer request message for the fund transfer (including the ISO standard message and the GUID) to the gateway 104. In response, the gateway 104 deserializes the data in the transfer request message, at 316, whereby the GUID is pulled off of the message. In doing so, the gateway 104 preserves the payload as the ISO standard message for the fund transfer, whereby the structured data of the ISO standard message is retained. And, the gateway 104 compiles, at 318, a mapping data structure for the fund transfer to store the GUID in association with the transaction ID for the fund transfer (as retrieved from the ISO standard message for the fund transfer) and/or other transaction data for the fund transfer (as also retrieved from the ISO standard message for the fund transfer).

Further in the method 300, with the ISO standard message and the GUID separated (and de-serialized from the transfer request message), the gateway 104 next transmits, at 320, the ISO standard message to the payment network 106 and, in particular, to the interface processor 114 thereof (apart from the transfer request message and the GUID). In turn, the interface processor transmits, at 322, the ISO standard message for the fund transfer to the issuer 108.

Upon receipt of the ISO standard message for the fund transfer, the issuer 108 determines, at 324, whether to approve or decline the fund transfer from the payment account associated with the user 112. The issuer 108 then compiles a reply message (e.g., an ISO formatted message consistent with the formatting of the ISO standard message received from the interface processor 114, etc.), in response to the ISO standard message, indicating the approval or decline of the fund transfer (as well as the transaction ID for the fund transfer, etc.). Once compiled, the issuer 108 transmits, at 326, the reply message back to the interface processor 114. And, in turn, the interface processor 114 transmits, at 328, the reply message to the gateway 104.

In response to the reply message from the issuer 108, the gateway 104 retrieves, at 330, the GUID for the fund transfer from the mapping data structure (based on the transaction ID for the fund transfer as included in the reply message) and serializes, at 332, the ISO formatted reply message (with the GUID), as described above, to compile a transfer reply message (e.g., to thereby generate a transfer reply message, etc.), with the ISO formatted reply message included as a payload and the GUID includes as a header. The gateway 104 then transmits, at 334, the transfer reply message to the transfer service 102, whereby the transfer service is able to de-serialize the transfer reply message and communicate the response from the issuer 108 (as included in the ISO reply message) with the user 112. In this manner, again, the GUID is maintained with the fund transfer, whereby tracking and/or monitoring is immediately available to the gateway 104, while analytics related to data associated with the fund transfer may be further available to the payment network 106 (in communication with the gateway 104, etc.).

In the above example method, the request may include a transaction request related to the transfer of funds. In connection therewith, serializing the GUID and the compiled message may include serializing the GUID and the compiled message consistent with a protocol buffer method. And, the network may be provided consistent with a remote procedure call (RPC) framework, wherein transmitting the serialized message may include transmitting the serialized message along a communications network consistent with the RPC framework.

The example method may also include the interface processor de-serializing the serialized message and then transmitting at least part of the de-serialized message (e.g., the ISO message, etc.) to the issuer 108. In such an example, the gateway 104 may further compile a data structure including the GUID is associated with data included in at least a part of the de-serialized message transmitted to the issuer 108.

In view of the above, the systems and methods herein provide for tracking, monitoring, etc. transaction messages from one end of a payment network (e.g., from a service at which the transaction message originated, etc.) to the other end of the payment network (e.g., to a banking institution associated with an account involved in the transaction, etc.). In doing so, the systems and methods accommodate, integrate, etc. different messaging protocols typically involved with such transactions to allow individual transactions to be generally traceable for end-to-end visibility. This may alleviate disconnects conventional encountered in processing the transactions by providing generally real-time status for the transactions whereby, for example, duplication may be avoided, fraud may be detected more expediently, etc.

Again and as previously described, it should be appreciated that the functions described herein, in some embodiments, may be described in computer executable instructions stored on a computer readable media, and executable by at least one processor. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving a request from a user relating to at least one service associated with a network including the service computing device; (b) compiling a message based on the request, wherein the message is consistent with a first message standard; (c) requesting a global unique identifier (GUID) for the request from a generator included in and/or associated with the network, whereby the generator compiles the GUID and returns the GUID to the service computing device; (d) serializing the GUID and the compiled message to form a serialized message, wherein the compiled message defines a first parameter of the sterilized message and the GUID defines a second parameter of the serialized message; and (e) transmitting the serialized message to a message gateway of the network, whereby the GUID is provided with the compiled message, while maintaining the compiled message consistent with the first message standard.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in correlating messages across multiple disparate interfaces, the method comprising:
    receiving, at a service computing device, a request from a user relating to at least one service associated with a network including the service computing device;
    compiling, by the service computing device, a message based on the request, wherein the message is consistent with a first message standard;
    requesting, by the service computing device, a global unique identifier (GUID) for the request from a generator included in and/or associated with the network, whereby the generator compiles the GUID and returns the GUID to the service computing device;
    serializing, by the service computing device, consistent with a protocol buffer method, the GUID and the compiled message to form a serialized message, wherein the compiled message defines a first parameter of the serialized message and the GUID defines a second parameter of the serialized message; and
    transmitting, by the service computing device, the serialized message to a message gateway of the network, along a communications network consistent with a remote procedure call (RPC) framework, whereby the GUID is provided with the compiled message, while maintaining the compiled message consistent with the first message standard.

2. The computer-implemented method of claim 1, wherein the request includes a transaction request related to a transfer of funds.

3. The computer-implemented method of claim 1, wherein transmitting the serialized message includes transmitting the serialized message along a communications network consistent with a remote procedure call (RPC) framework.

4. The computer-implemented method of claim 1, further comprising de-serializing, by the message gateway, the serialized message and transmitting at least part of the compiled message in the first message standard to an issuer of an account to which the request is directed.

5. The computer-implemented method of claim 4, further comprising:
    compiling, by the generator, the GUID; and
    transmitting, by the generator, the GUID to the service computing device.

6. The computer-implemented method of claim 4, further comprising compiling, by the message gateway, a data structure including the GUID in association with data included in the at least part of the compiled message, whereby the GUID is linked to the compiled message via the data structure.

7. The computer-implemented method of claim 1, wherein the first message standard includes one of an International Organization for Standardization (ISO) 8583 standard and an ISO 20022 standard.

8. A non-transitory computer-readable storage medium comprising computer-executable instructions, which when executed by at least one processor in connection with correlating messages across multiple disparate interfaces, cause the at least one processor to:
    receive a request from a user relating to at least one service associated with a network including a service computing device;
    compile a message based on the request, wherein the message is consistent with a first message standard;
    request a global unique identifier (GUID) for the request from a generator included in and/or associated with the network, whereby the generator compiles the GUID and returns the GUID to the service computing device;
    serialize the GUID and the compiled message to form a serialized message, consistent with a protocol buffer method, wherein the compiled message defines a first parameter of the serialized message and the GUID defines a second parameter of the serialized message; and
    transmit the serialized message to a message gateway of the network, whereby the GUID is provided with the compiled message, while maintaining the compiled message consistent with the first message standard.

9. The non-transitory computer-readable storage medium of claim 8, wherein the computer-executable instructions, when executed by the at least one processor to transmit the serialized message, cause the at least one processor to transmit the serialized message along a communications network consistent with a remote procedure call (RPC) framework.

10. The non-transitory computer-readable storage medium of claim 9, wherein the request includes a transaction request related to a transfer of funds.

11. The non-transitory computer-readable storage medium of claim 10, wherein the first message standard includes one of an International Organization for Standardization (ISO) 8583 standard and an ISO 20022 standard.

12. A system for use in correlating messages across multiple disparate interfaces, the system comprising:
a service computing device of a fund transfer service configured to facilitate a fund transfer associated with an account of a user, the service computing device configured to:
receive a transaction request from the user relating to the fund transfer;
compile a message based on the transaction request, wherein the message is consistent with a first message standard;
request a global unique identifier (GUID) for the transaction request from a generator in communication with the service computing device, whereby the generator compiles the GUID and returns the GUID to the service computing device;
serialize the GUID and the compiled message to form a serialized message, consistent with a protocol buffer method wherein the compiled message defines a first parameter of the serialized message and the GUID defines a second parameter of the serialized message; and
transmit the serialized message to a message gateway in communication with the service computing device, whereby the GUID is provided with the compiled message, while maintaining the compiled message consistent with the first message standard.

13. The system of claim 12, wherein the service computing device is configured, in order to transmit the serialized message, to transmit the serialized message along a communications network consistent with a remote procedure call (RPC) framework.

14. The system of claim 12, wherein the first message standard includes one of an International Organization for Standardization (ISO) 8583 standard and an ISO 20022 standard.

15. The system of claim 12, further comprising the message gateway, wherein the message gateway is configured to:
de-serialize the serialized message; and
transmit at least part of the compiled message, from the serialized message, in the first message standard to an issuer of the account of the user.

16. The system of claim 15, further comprising the generator, wherein the generator is configured to:
compile the GUID; and
transmit the GUID to the service computing device.

17. The system of claim 16, wherein the message gateway is further configured to compile a data structure including the GUID in association with data included in the at least part of the compiled message, whereby the GUID is linked to the compiled message via the data structure.

* * * * *